United States Patent
Kaga (10) Patent No.: US 9,016,588 B2
(45) Date of Patent: Apr. 28, 2015

(54) WIRELESS IC TAG

(71) Applicant: Mitomo Corporation, Kanagawa (JP)

(72) Inventor: Kikuo Kaga, Tokyo (JP)

(73) Assignee: Mitomo Corporation, Kanagawa (JP)

( * ) Notice: Subject to any disclaimer, the term of this patent is extended or adjusted under 35 U.S.C. 154(b) by 0 days.

(21) Appl. No.: 13/705,465

(22) Filed: Dec. 5, 2012

(65) Prior Publication Data

US 2013/0221111 A1   Aug. 29, 2013

(30) Foreign Application Priority Data

Feb. 27, 2012  (JP) .................................. 2012-40775

(51) Int. Cl.
| | | |
|---|---|---|
| *G06K 19/06* | (2006.01) | |
| *G06K 19/00* | (2006.01) | |
| *H01Q 7/08* | (2006.01) | |
| *H01Q 1/00* | (2006.01) | |
| *G06K 19/077* | (2006.01) | |
| *G06K 19/04* | (2006.01) | |

(52) U.S. Cl.
CPC ........ *G06K 19/07773* (2013.01); *G06K 19/041* (2013.01); *G06K 19/07758* (2013.01); *G06K 19/07794* (2013.01)

(58) Field of Classification Search
CPC .................. G06K 19/07749; G06K 19/07767; H01Q 7/06; H01Q 1/2225; H01Q 1/38; H01Q 7/08
USPC .......... 235/487, 492; 343/787, 788; 340/10.1, 340/572.7
See application file for complete search history.

(56) References Cited

U.S. PATENT DOCUMENTS

| | | | | |
|---|---|---|---|---|
| 3,031,667 A | * | 4/1962 | Wennerberg | .................. 343/788 |
| 5,923,300 A | * | 7/1999 | Mejia | ............................. 343/788 |
| 6,577,284 B1 | * | 6/2003 | Conti | ............................. 343/788 |
| 8,237,622 B2 | * | 8/2012 | Furumura et al. | ............ 343/895 |
| 8,267,622 B1 | * | 9/2012 | MacLean-Blevins et al. | ............................. 406/186 |

(Continued)

FOREIGN PATENT DOCUMENTS

| | | |
|---|---|---|
| JP | 8-167015 | 6/1996 |
| JP | 2000-048150 | 2/2000 |

(Continued)

OTHER PUBLICATIONS

Decision of Patent Grant issued Sep. 30, 2014 in Japanese Application No. 2012-040775, with English translation thereof.

*Primary Examiner* — Thien M Le
*Assistant Examiner* — Claude J Brown
(74) *Attorney, Agent, or Firm* — Wenderoth, Lind & Ponack, L.L.P.

(57) ABSTRACT

A wireless IC tag, to which data can be written by using an IC tag introducing machine, the wireless IC tag can ensure the communication distance required for writing and reading data in the wireless IC tag formed in a dimension that does not intensively affect the strength of the material for building a construction and is provided with antennas with performance of excellent directionality, is provided. The wireless IC tag including an RFID tag module, a plate-shaped ferrite core to which the] RFID tag module is mounted, a primary antenna wound around a circumferential surface of the plate-shaped ferrite core, the primary antenna being connected with the RFID tag module, and a pair of secondary antennas, each of the pair of secondary antennas being wound around a circumferential surface of the plate-shaped ferrite core and being connected with the RFID tag module.

12 Claims, 8 Drawing Sheets

(56) References Cited

U.S. PATENT DOCUMENTS

| | | | |
|---|---|---|---|
| 2002/0080083 A1* | 6/2002 | Nantz et al. | 343/788 |
| 2003/0122725 A1* | 7/2003 | Ieda et al. | 343/788 |
| 2003/0222829 A1* | 12/2003 | Kitahara et al. | 343/788 |
| 2004/0074974 A1* | 4/2004 | Senba et al. | 235/492 |
| 2005/0270249 A1* | 12/2005 | Saegusa et al. | 343/788 |
| 2006/0022056 A1* | 2/2006 | Sakama et al. | 235/492 |
| 2006/0214791 A1* | 9/2006 | Tethrake et al. | 340/572.1 |
| 2007/0060326 A1* | 3/2007 | Juds et al. | 463/29 |
| 2007/0091009 A1* | 4/2007 | Lueg-Althoff et al. | 343/867 |
| 2007/0126650 A1* | 6/2007 | Guenther | 343/788 |
| 2007/0152829 A1* | 7/2007 | Lindsay et al. | 340/572.3 |
| 2007/0205291 A1* | 9/2007 | Aramaki et al. | 235/492 |
| 2007/0247387 A1* | 10/2007 | Kubo et al. | 343/788 |
| 2008/0088460 A1* | 4/2008 | Copeland | 340/572.7 |
| 2009/0009418 A1 | 1/2009 | Masin et al. | |
| 2009/0166434 A1* | 7/2009 | Taniguchi et al. | 235/492 |
| 2009/0189729 A1* | 7/2009 | Kubo et al. | 336/221 |
| 2009/0243397 A1* | 10/2009 | Cook et al. | 307/104 |
| 2009/0289765 A1 | 11/2009 | Kaga et al. | |
| 2009/0289797 A1* | 11/2009 | Sakama | 340/572.8 |
| 2009/0295663 A1* | 12/2009 | Sato | 343/788 |
| 2009/0306620 A1* | 12/2009 | Thilly et al. | 604/415 |
| 2010/0001837 A1* | 1/2010 | Mazzella et al. | 340/10.1 |
| 2010/0032437 A1 | 2/2010 | Lossau | |
| 2010/0053014 A1* | 3/2010 | Yosui et al. | 343/787 |
| 2010/0097191 A1* | 4/2010 | Yamagajo et al. | 340/10.1 |
| 2010/0156642 A1* | 6/2010 | Lindsay et al. | 340/572.7 |
| 2011/0254665 A1* | 10/2011 | Lindsay et al. | 340/10.5 |
| 2011/0291805 A1* | 12/2011 | Gelowitz et al. | 340/10.1 |
| 2012/0032632 A1* | 2/2012 | Soar | 320/108 |
| 2012/0061475 A1* | 3/2012 | Kube et al. | 235/492 |
| 2012/0074899 A1 | 3/2012 | Tsai et al. | |
| 2012/0086556 A1* | 4/2012 | Ikemoto | 340/10.1 |
| 2012/0104097 A1 | 5/2012 | Moran et al. | |
| 2012/0199658 A1 | 8/2012 | Kaga et al. | |
| 2012/0223149 A1* | 9/2012 | Kato | 235/492 |
| 2013/0178153 A1* | 7/2013 | Thoen | 455/41.1 |
| 2013/0181876 A1* | 7/2013 | Miura et al. | 343/788 |

FOREIGN PATENT DOCUMENTS

| | | |
|---|---|---|
| JP | 2000-105802 | 4/2000 |
| JP | 2003-317052 | 11/2003 |
| JP | 2005-64468 | 3/2005 |
| JP | 2006-011012 | 1/2006 |
| JP | 2006-086603 | 3/2006 |
| JP | 2006-145385 | 6/2006 |
| JP | 2007-080153 | 3/2007 |
| JP | 2007-087223 | 4/2007 |
| JP | 2008-077140 | 4/2008 |
| JP | 2008-197714 | 8/2008 |
| JP | 2009-237795 | 10/2009 |
| JP | 2009-282688 | 12/2009 |
| JP | 2009-289226 | 12/2009 |
| JP | 2011-029678 | 2/2011 |
| JP | 2011-186839 | 9/2011 |
| JP | 2011-253362 | 12/2011 |
| WO | 2012/005278 | 1/2012 |

\* cited by examiner

WIRELESS IC TAG

BACKGROUND OF THE INVENTION

1. Field of the Invention

The present invention relates to a wireless IC tag configured to perform reading and writing various product data, and particularly to a wireless IC tag comprising an RFID tag, both directionality and communication distance of which have been improved.

2. Prior Art

A method for implementing quality management for a product, which normally exists in any state of liquid, viscous or semi-solid during the manufacturing, such as fresh concrete and a thermoplastic resin, by means of incorporating an IC tag having been written with various data in advance in the product before the product has been hardened, and then reading the data or writing new data from/to the IC tag incorporated in the hardened product via radio communication, has already been known.

The wireless IC tag as described above is prepared by molding the tag chip, to which a capacitor, an RFID tag module, an antenna coil and so on are mounted, with a resin material to shape the molded tag chip into a small piece, the form of which is global, cylindrical, columnar or the like. The prepared wireless IC tag is then introduced into the material for building a construction before the material is hardened. Note that the tag substrate (chip) must be enclosed in the central portion of the molded resin piece and is caused to face a predetermined direction in order to effectively perform writing and reading operations of signals via radio communication. Additionally, an IC tag provided with plural small recesses and/or grooves on its outer shell body formed of a resin material for aiming at enhancing the contact of the IC tag to the material for building a construction without causing gaps therebetween while keeping appropriate adhesiveness to each other, when the IC tag is introduced into the material for building a construction, blended, and mixed, is also known.

REFERENCES OF THE PRIOR ART

Patent Documents

[Patent Document 1]: Japanese Unexamined Patent Application Publication No. 2006-145385
[Patent Document 2]: Japanese Unexamined Patent Application Publication No. 2009-282688
[Patent Document 3]: Japanese Unexamined Patent Application Publication No. 1996-167015
[Patent Document 4]: Japanese Unexamined Patent Application Publication No. 2005-64468

SUMMARY OF THE INVENTION

The wireless IC tag of the type as described above is introduced into a material for building a construction, such as cement and mortar, together with gravel, water, etc. by means of an IC tag incorporating machine and is then kneaded with the material for building a construction. The cement or mortar product incorporated with the wireless IC tags is fed by virtue of compressed air to a construction site and casted there to build a concrete construction, such as a building, a bridge and a tunnel. Consequently, the wireless IC tags are embedded in the concrete construction so that they locate at positions certain distance inside from the wall of the construction and are caused to face various directions at random.

At the time of unloading and casting of the cement or mortar product, and after hardening thereof, writing of data signals is started via radio communication. However, there is a problem of difficulty in implementing the effective communication when the radio communication is carried out in such a condition that the wireless IC tags are embedded at locations in the construction, which are so far from the wall surface, or when the radio communication is carried out in such a situation that the direction of the antenna to the reader/writer is turned away.

It is an object of the present invention to provide a wireless IC tag, to which data writing can be securely implemented by using an IC tag introducing apparatus, that can be formed in a dimension which does not affect the strength of the material for building a construction to be incorporated with the wireless IC tag, that can ensure a communication distance required for reading and writing data, and that is provided with an antenna having excellent directionality.

It is a further object of the present invention to provide a wireless IC tag which has such a strength and stability to chemicals that the wireless IC tag main body will not be affected even it is introduced into a material for building a construction to be incorporated with the wireless IC tag, such as a cement product and a mortar product. Further, it is also an object of the present invention to provide a wireless IC tag which is compatibly mingled with the material for building a construction to be incorporated with the wireless IC tag.

The wireless IC tag according to the present invention is characterized in that an RFID tag module is mounted on a plate-shaped ferrite core and antennas respectively having been connected to the RFID tag module are placed to the surface of the plate-shaped ferrite core.

The wireless IC tag according to the present invention is further characterized in that the antennas to be fixed to the surface of the ferrite core include a primary antenna to be wound at substantially central part in the circumferential surface of the plate-shaped ferrite core and a pair of secondary antennas to be wound at both lateral positions of the primary antenna.

Further, the antennas to be fixed to the surface of the ferrite core are characterized by being consisted of a first primary antenna and a pair of first secondary antennas, those which are wound from one direction on the circumferential surface of the plate-shaped ferrite core, and a second primary antenna and a pair of second secondary antennas, those which are wound from the other direction perpendicular to the one direction on the circumferential surface of the plate-shaped ferrite core.

The antennas to be fixed on the surface of the ferrite core are characterized by being fixed on both the upper and under sides of the plate-shaped ferrite core.

The antennas to be fixed on both the upside and underside of the ferrite core are characterized by being wound in a spiral state along the shape of the plate-shaped ferrite core.

The antennas to be fixed on the ferrite core are characterized by being formed by means of printing technique.

The wireless IC tag according to the present invention is characterized by being consisted of a plate-shaped ferrite core, to which an RFID tag module is mounted, and antennas, and that the wireless IC tag being molded with a protective enclosure.

The protective enclosure is characterized by being a columnar outer shell body.

The wireless IC tag according to the present invention is characterized in that circumferential protrusions are formed on the outer peripheries of both end portions of the columnar outer shell body forming the protective enclosure.

The wireless IC tag according to the present invention is further characterized in that a plurality of concave portions are formed on the surface of the protective enclosure.

The wireless IC tag according to the present invention is still further characterized in that a plurality of concave grooves extending in the axial direction are formed on the body section of the columnar outer shell body forming the protective enclosure.

BRIEF DESCRIPTION OF THE DRAWINGS

FIG. 2 is a schematic circuit diagram of the wireless IC tag shown in

FIG. 1.

DESCRIPTION OF THE REFERENCE NUMERALS

1: Wireless IC tag
2: Ferrite core
22, 23: End surface of ferrite core
31: Primary antenna
32, 33: Secondary antenna
4: RFID tag module
41: Capacitor
42: A part of RFID tag module
5: Wireless IC tag
6: Ferrite core
62, 63: End surface of ferrite core
71a, 71b: Primary antenna
72a, b; 73a, b: Secondary antenna
8a, 8b: A part of RFID tag module
81a, 81b: Capacitor
82a, 81b: A part of RFID tag module
9: Wireless IC tag
11: Ferrite core
12a: Upside of ferrite core
12b: Underside of ferrite core
10: Wireless IC tag
101: Outer shell body
102: End surface of outer shell body
103: End surface of outer shell body
104: Concave groove
20: Wireless IC tag
201: Outer shell body
202: Protrusion
203: Protrusion
204, 208: Burr-like protrusion
205: Concave groove
207: End surface of outer shell body
90: IC tag introducing machine
91: Tag release outlet
92: Feed hopper
93: Vibratory alignment device
94: Inclined falling chute
95: Vertical falling passage

DETAILED DESCRIPTION OF THE PREFERRED EMBODIMENTS

Now, the examples according to the present invention are described with referring to the appended drawings. Note that the examples of the wireless IC tag to be introduced into fresh concrete during mixing thereof are given in the following, the wireless IC tag according to the present invention is not limited to the one to be incorporated with fresh concrete and may also be applied to a liquid, viscous or semi-solid materials, e.g. mortar, a thermoplastic resin material in the melted state, and gypsum before being hardened.

Example 1

Figure 1:
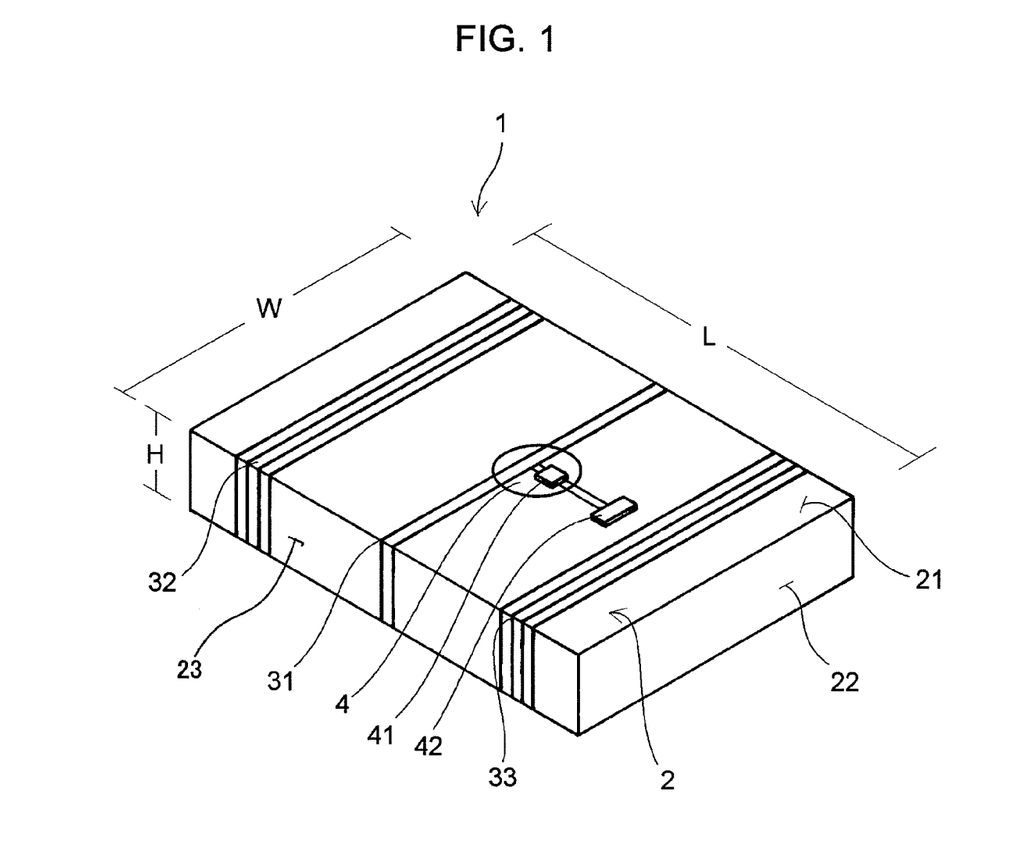
FIG. 1 is a perspective view of the wireless IC tag according to an example of the present invention.
Figure 2:
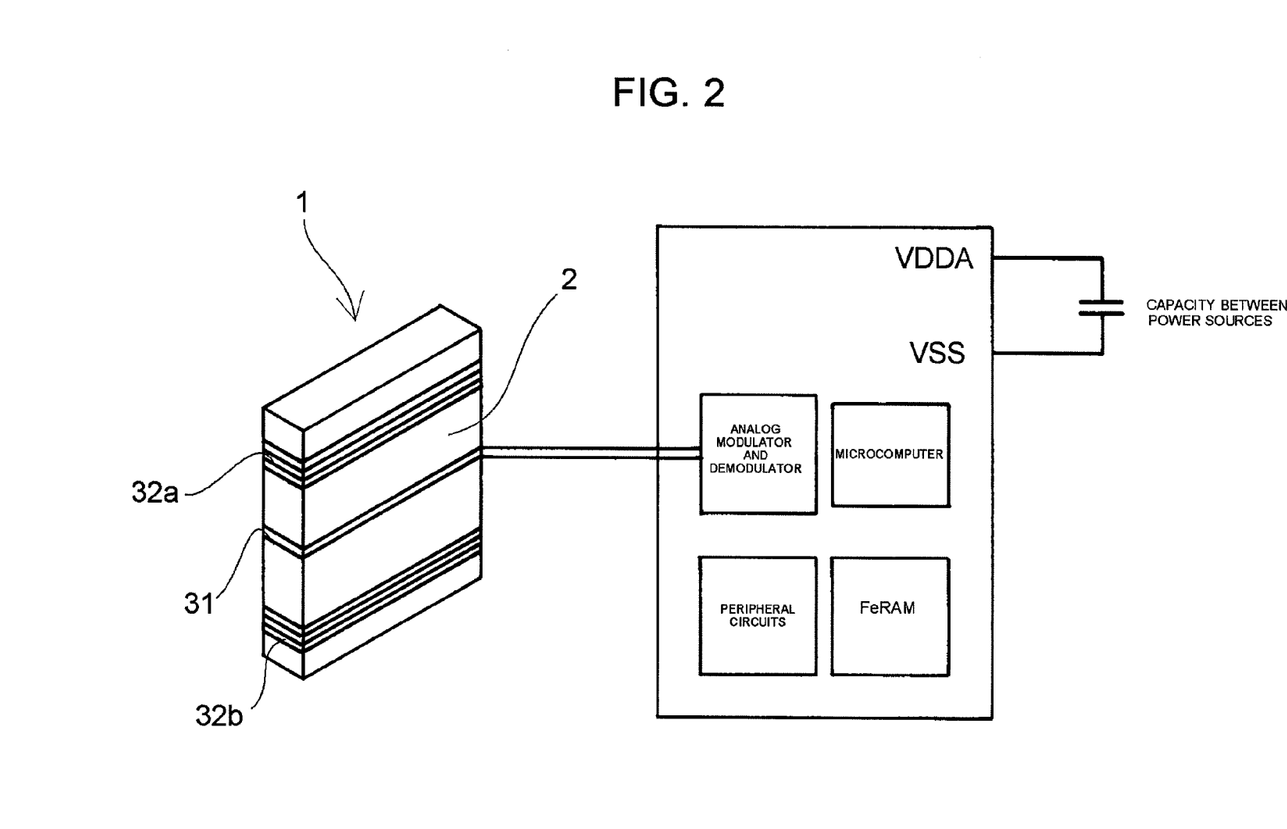

Now, the wireless IC tag 1 according to the first embodiment of the present invention is explained with referring to FIGS. 1 and 2. The wireless IC tag 1 is constructed from a flat and short-rectangular ferrite core 2, an RFID tag module 4 adapted to be mounted to the ferrite core 2 and antennas 31 to 33 to be wound around the ferrite core 2.

The ferrite core 2 is either made of one plate-shaped ferrite or a plate-like ferrite core formed by laminating several thin ferrite plates. In this example, the ferrite core 2 is shaped in a plate-like configuration with a dimension of 16 to 18 mm in the length and the width (L×W), respectively, and 2 to 3 mm in the thickness (H), and is configured to be enclosed in the protective enclosure described later.

On the surface of the ferrite core 2, an RFID tag module is mounted. The RFID tag module 4 to be mounted on the surface 21 of the ferrite core 2 is an RFID tag using an FeRAM (8 KByte), that is a non-volatile memory utilizing a ferroelectric, and is configured in the form of a chip 42 in which the parts, such as an FeRAM, an analog demodulator, a microcomputer and peripheral circuits, are packaged and mounted on the ferrite core 2. To the RFID tag module 4, a capacitor 41 and a primary antenna 31 as well are connected. A capacity between power sources (30 µF in this example) is additionally provided to the RFID tag module 4 in order to take a measure against a limiting factor to the communication rate.

In this example, two-stage booster ferrite core antenna is used in order to improve the directionality of an antenna to be used. Winding of the antenna is started in a direction from the circumferential surface of the ferrite core 2. In this example, the antenna is wound by starting from one end 23 in the longitudinal direction of the ferrite core 2 toward the other end in parallel to the shorter side of the ferrite core 2, and the primary antenna 31 having been connected to the RFID tag module 4 is wound around the middle position in the longitudinal direction of the ferrite core 2, and the secondary antennas 32, 33 are wound respectively at both lateral positions of the primary antenna. In this example, the primary antenna 31 is configured as a coil having been wound twice, and the secondary antennas 32, 33 are configured as a coil having been wound four times, respectively. These coils configuring the antennas 31, 32 and 33 are formed on the ferrite core 2 by means of printing wiring technique. In the wireless IC tag 1, data writing is achieved from the axis line direction of the primary coil and the secondary coils. In this example, communication is set up so that communication is carried out between the IC tag introducing machine 90 and the reader/writer (not shown) at the frequency band of 13.56 MHz.

By structuring the wireless IC tag 1 as described above, a wireless IC tag 1, which can be operated with low magnetic field, has excellent antenna directionality and can perform excellent communication in terms of communication distance and the rate, can be provided.

Example 2

Figure 3:
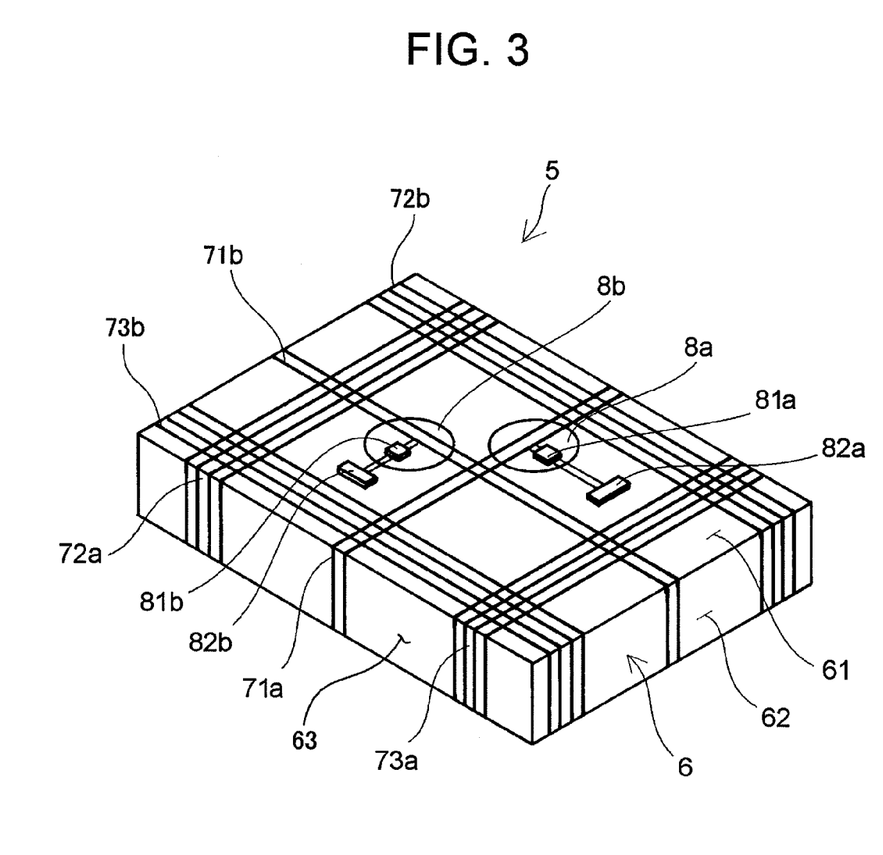
FIG. 3 is a perspective view of the wireless IC tag according to another example of the present invention.

Now, the wireless IC tag 5 according to the second example of the present invention is described with referring to FIG. 3. The wireless IC tag 5 is constructed from a flat and rectangular ferrite core 6, an RFID tag modules 8a, 8b adapted to be mounted on the ferrite core 6, and antennas 71a, 71b, 72a, 72b, 73a, 73b to be wound around the ferrite core 6.

The plate-shaped ferrite core 6 is made of either one plate-shaped ferrite or a plate-like ferrite core formed by laminating several thin ferrite plates. In this example, the ferrite core 6 is shaped in a plate-like configuration with a dimension of 16 to 18 mm in the length and the width (L×W), respectively, and 2 to 3 mm in the thickness (H), and is configured to be enclosed in the protective enclosure described later.

Two RFID tag modules 8a, 8b are mounted on the surface 61 of the ferrite core 6, and two antennas respectively connected to the RFID tag modules 8a, 8b as described later are wound in two directions, respectively on the circumferential surface of the ferrite core 6. The RFID tag module 8a, 8b is an RFID tag which uses a non-volatile memory, namely an FeRAM (8 KByte) employing a ferroelectric. In the RFID tag module 8a, 8b, an FeRAM, an analog demodulator, a microcomputer, and parts such as peripheral circuits 82a, 82b, are formed into a chip and the chip is mounted on the ferrite core. To the RFID tag module 8a, 8b, capacitors 81a, 81b and primary antennas 71a, 71b as well are connected, respectively. A capacity between power sources (30 μF in this example) is additionally provided to the RFID tag modules 8a, 8b in order to take a measure against a limiting factor to the communication rate.

In this example, a two-stage booster ferrite core antenna is used in order to improve the directionality of an antenna to be used. The first antenna is wound in a direction from the circumferential surface of the ferrite core 6. In this example, the antenna is wound from one end 63 in the longitudinal direction of the ferrite core 6 toward the other end in parallel to the shorter side of the ferrite core 6, and the primary antenna 71a having been connected to the RFID tag module 6 is wound around the middle portion in the longitudinal direction of the ferrite core 6, and the secondary antennas 72a, 73a are wound respectively at both lateral positions of the primary antenna. In this example, the primary antenna 71a is configured as a coil having been wound twice, and the secondary antennas 72a, 73a are configured as a coil having been wound four times, respectively. These coils configuring the antennas 71a, 72a and 73a are formed on the ferrite core 6 by means of printing wiring technique.

The second antennas are then wound in the other directions on the ferrite core 6 so that the second antennas extend in directions perpendicular to the antennas 71a, 72a and 73a. In this example, the primary antenna 71b having been connected to the RFID tag module 8b is wound from one end 62 at the shorter side of the ferrite core 6 toward the other end, and the secondary antennas 72b, 73b are wound on both lateral positions of the primary antenna 71b. The primary antenna 71b is configured as a coil having been wound twice, and the secondary antennas 72b, 73b are configured as a coil having been wound four times, respectively. These antennas are also formed on the ferrite core 6 by means of printing wiring technique.

The wireless IC tag described above is configured such that data writing is implemented from the respective axis line directions of the primary coil and the secondary coils, with the primary coil and the secondary coils are wound separately in different directions. Note that, though two RFID tag modules 8 are provided in this example, one RFID tag module which is common to antennas 71a, 72a and 73a to be wound in a direction and antennas 71b, 72b and 73b to be wound in the direction perpendicular to the aforementioned direction of the antennas 71b, 72b and 73b may be mounted on the ferrite core 6. Additionally, the condition for communication may be set up so as to implement communication separately at different frequency bands in order to avoid radio waves from the antennas 71a, 72a and 73a being wound in a direction and radio waves from the antennas 71b, 72b and 73b being wound in the other direction from interfering to each other.

By structuring the wireless IC tag 1 as described above, a wireless IC tag 1, which has excellent antenna directionality and can perform excellent communication with the reader/writer in terms of communication distance and communication rate can be provided.

Example 3

Figure 4:
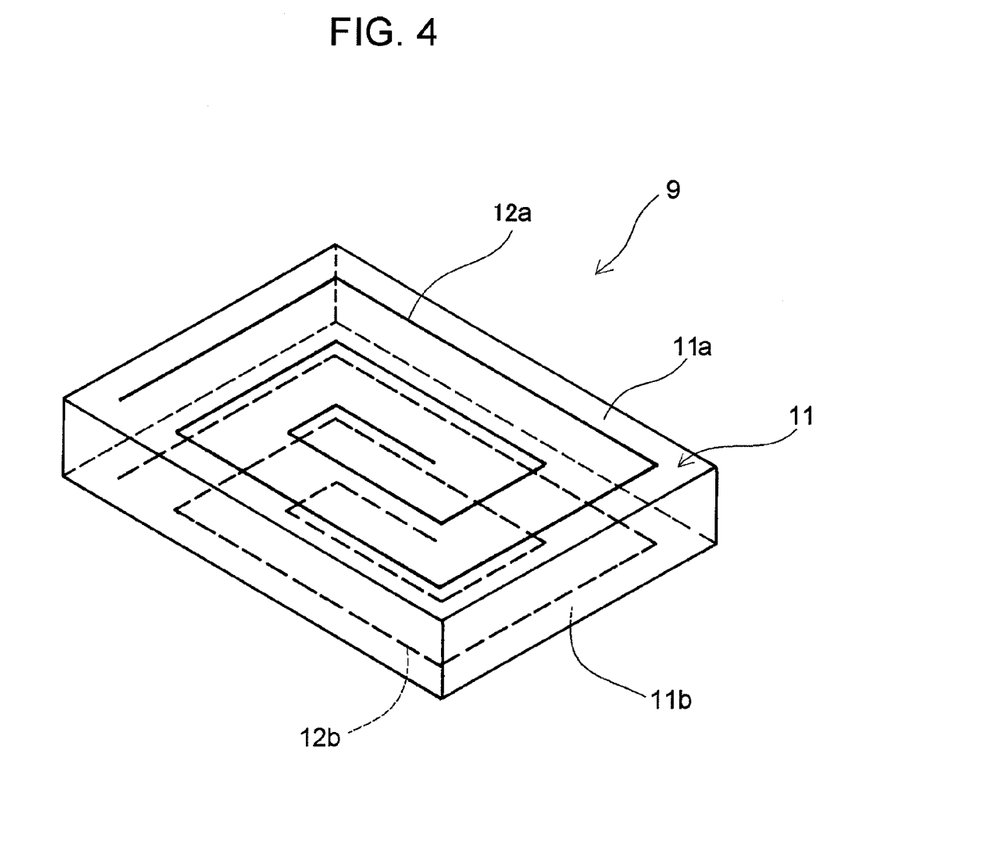
FIG. 4 is a perspective view of the wireless IC tag according to still another example of the present invention.

Now, the wireless IC tag 9 according to the third example of the present invention is explained with referring to FIG. 4. The wireless IC tag 9 is constructed of flat and rectangular ferrite core 11, an RFID tag module (not shown) adapted to be mounted to the ferrite core 11, and antennas 12a, 12b to be arranged on both of the upside and underside of the ferrite core 11, namely on each of the opposing surfaces of the flat ferrite core 11.

The plate-shaped ferrite core 11 is made of either one plate-shaped ferrite or a plate-like ferrite core formed by laminating several thin ferrite plates. In this example, the ferrite core 11 is shaped in a plate-like configuration with a dimension of 16 to 18 mm in the length and the width (L×W), respectively, and 2 to 3 mm in the thickness (H), and is configured to be enclosed in the protective enclosure described later.

Two RFID tag modules (not shown) are mounted on the upside 11a and underside 11b of the ferrite core 11, respectively, and each antenna having been connected to the RFID tag modules as described later is arranged spirally to the upside and underside of the ferrite core 11, respectively. The RFID tag module is an RFID tag which uses a non-volatile memory, namely an FeRAM (8 KByte) employing a ferroelectric. In the RFID tag module, an FeRAM, an analog demodulator, a microcomputer, and parts such as peripheral circuits, are formed into a chip and the chip is mounted on the ferrite core. To the RFID tag module, a capacitor (not shown) and spiral antennas 12a, 12b as well are connected, respectively.

In this example, spiral antennas 12a, 12b are formed on both of the upside 11a and underside 11b of the ferrite core 11 by means of printing wiring in such a pattern that the antennas extend along the shape of the surface to be wired of the ferrite core 11 in order to improve the directionality of the antennas. Note that, although two RFID tag modules are provided in this example, an RFID tag module being common to an antenna 12a to be printed to one surface of the ferrite core and an antenna 12b to be printed to the other surface of the ferrite core may be mounted inside the ferrite core 11. Additionally, the condition for communication may be set up so as to implement communication separately at different frequency bands in order to avoid radio waves respectively transmitted from the antennas 12a and 12b printed on the ferrite core 11 from interfering to each other.

Example 4

Figure 5:
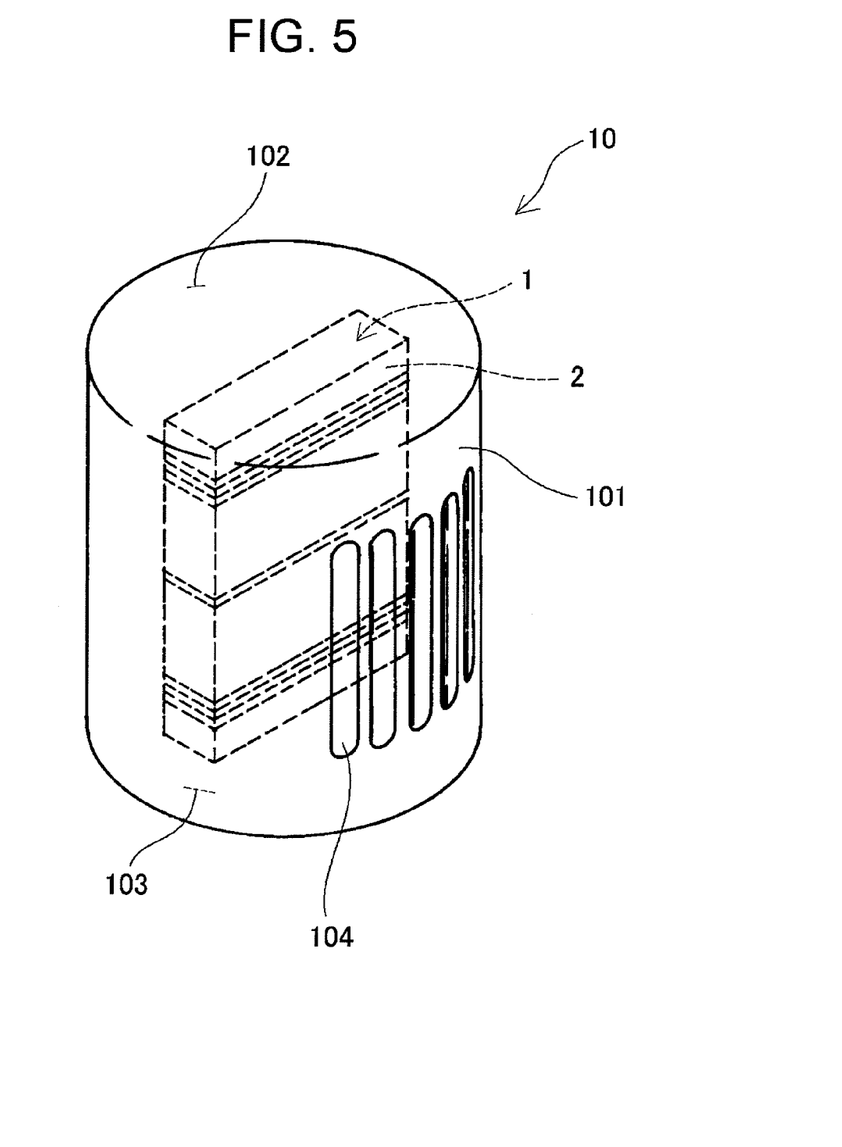
FIG. 5 is a perspective view showing the state that the wireless IC tag (main body) shown in FIG. 1 is molded with the protective enclosure.

The wireless IC tag 10 shown in FIG. 5 is produced by molding the wireless IC tag (main body) 1 shown in FIG. 1 with a protective enclosure. The protective enclosure is a outer shell body 101 generally shaped in a columnar form with the diameter (φ) of c.a. 17 mm and the height of c.a. 20 mm. And, in the body section of the columnar outer shell body 101, a plurality of shallow concave grooves 104 extending in the axial direction are formed. In the interior of the columnar outer shell body 101, the end surface 22 in the axial direction of the antenna of the wireless IC tag (main body) 1 comprising the flat and rectangular columnar ferrite core 2 as shown in FIG. 1 is enclosed such that the end surface 22 faces to the end surfaces 102, 103 in the axial direction of the outer shell body 101. Note that the outer shell body 101 is formed by injection molding so as to enclose the wireless IC tag (main body) 1 therein.

As the material for molding the outer shell body 101, a synthetic resin material which is excellent in the strength and the stability to chemicals shall be selected, so that the wireless IC tag (main body) 1 can be protected during such a period that the wireless IC tag is subjected to kneading with the material for building a construction and is remained in the embedded state in the hardened material used for building a construction. Particularly, when cement with strong alkalinity is used as the material for building a construction, either a polypropylene resin or a polyamide resin is used as the material for molding the outer shell body. Additionally, these resins may be reinforced with a reinforcing material, such as glass fibers and inorganic filler. Further, a glassy material for adjusting specific gravity use may be added to a resin composing the outer shell body 101 and kneaded together so that the specific gravity of the wireless IC tag 10 is adjusted to the suitable range for distribution itself in the material for building a construction. For example, a suitable range of the specific gravity of the wireless IC tag to be kneaded with the material for building a construction is approximately in a range of from 1.3 to 2.3.

Example 5

Figure 6:
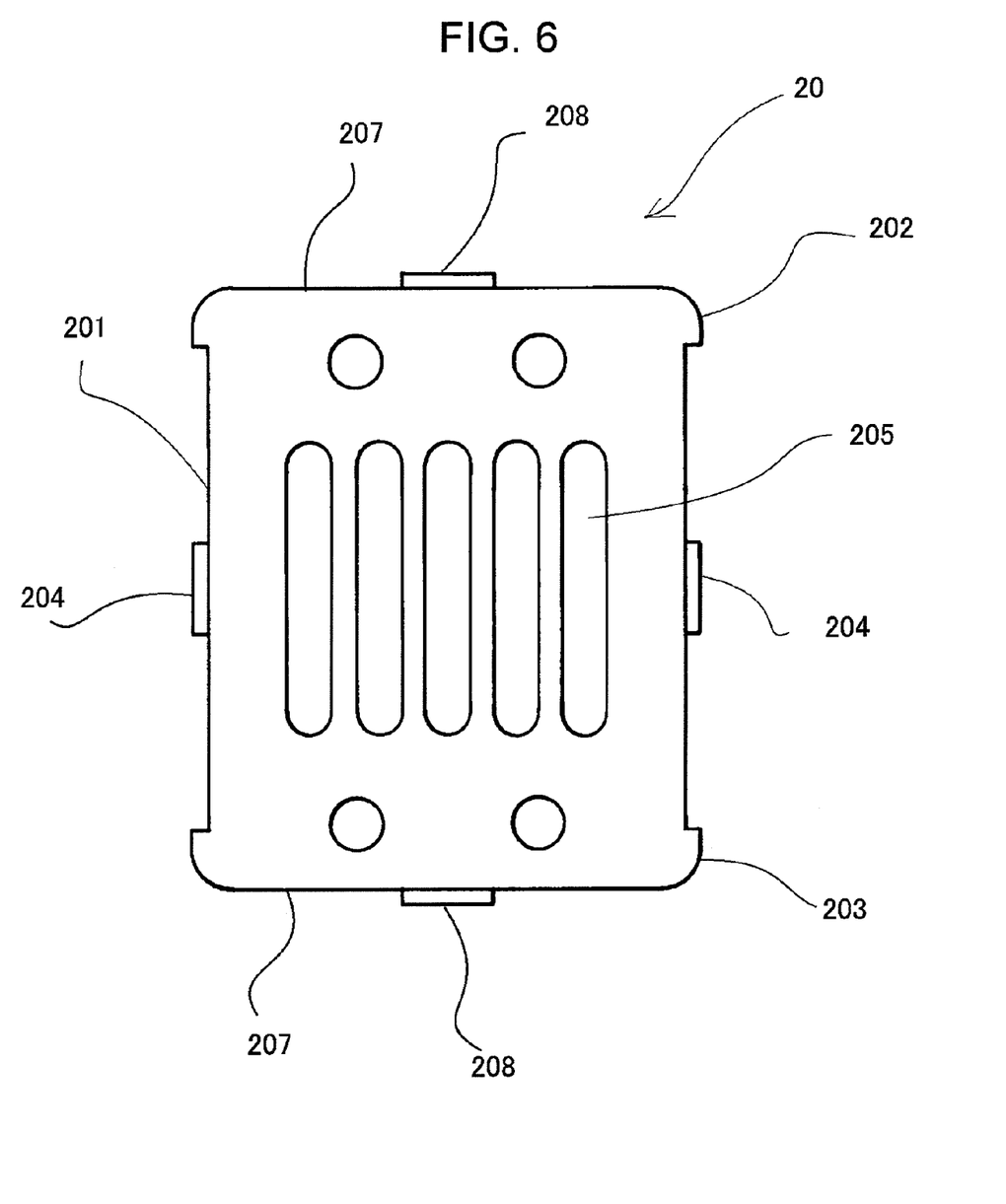
FIG. 6 is a front view of a protective enclosure.
Figure 7:
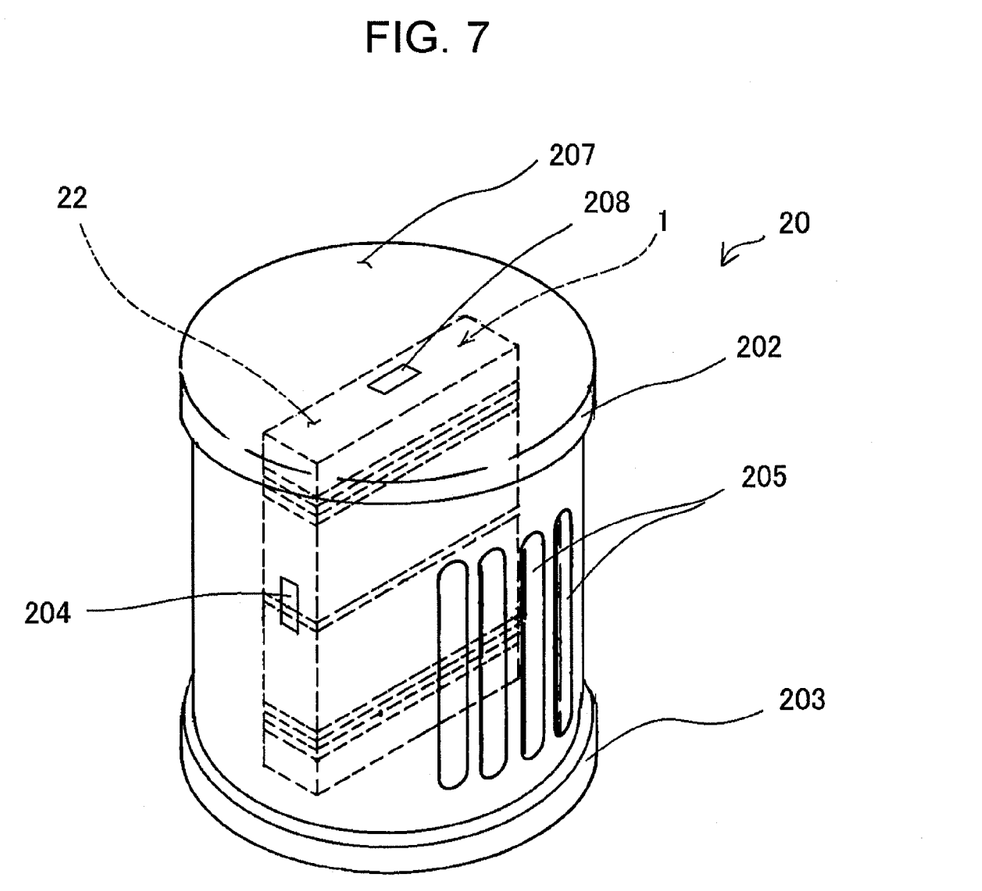
FIG. 7 is a perspective view showing the state that the wireless IC tag (main body) shown in FIG. 1 is molded with the protective enclosure shown in FIG. 6.

As shown in FIGS. 6 and 7, the wireless IC tag (main body) 1 may be enclosed by molding with the cylindrical outer shell body 20, and circumferential protrusions 202, 203 may be formed respectively in a flange shape on the outer peripheries of both end portions of the outer shell body 20 enclosing the wireless IC tag (main body) 1 therein. Further, the ridges of the protrusions 202, 203 are respectively round chamfered to thereby connecting the ridges to form both end surfaces of the outer shell body, respectively, so that the wireless IC tag is formed into a bobbin shape, and a plurality of shallow concave grooves 205 may be provided to the body section of the outer shell body 20. By virtue of arranging the protrusions 201, 202, the wireless IC tag 10 can be thrown to a further far position without getting such problems that the protrusion 204 is caught and remained at the release outlet 91 of the IC tag introducing machine 90 and that the leakage of compressed air is caused from the gap between a hose and a outer shell body 20, when the wireless IC tags are fed from the release outlet 91 of the IC tag introducing machine 90 described later through the hose to a kneading vessel, even though burr-like protrusions 204, 208 in irregular forms that correspond to the shape of the injection inlet for injection molding are formed at the time of molding using a die. In this case as well, the wireless IC tag (main body) 1 is enclosed such that the end surface 22 thereof in the antenna axis direction is caused to face the end surface 207 of the outer shell body 201 in the axial direction thereof. Note that the outer shell body 201 is formed by enclosing the wireless IC tag (main body) 1 with a material by means of injection molding.

Although the wireless IC tag 10, 20 formed by molding the wireless IC tag (main body) 1 is described in Example 4, the wireless IC tag (main body) to be molded in the outer shell body 101 may be either a wireless IC tag (main body) 5 in which antennas are provided in two different directions on the ferrite core 6, or a wireless IC tag (main body) 9 in which spiral antennas 12a, 12b are arranged on the ferrite core 11. Additionally, as the shape of the outer shell body, various shapes including global, elliptic, bale-like, barrel-like, rectangular solid and the like may be employed.

Figure 8:
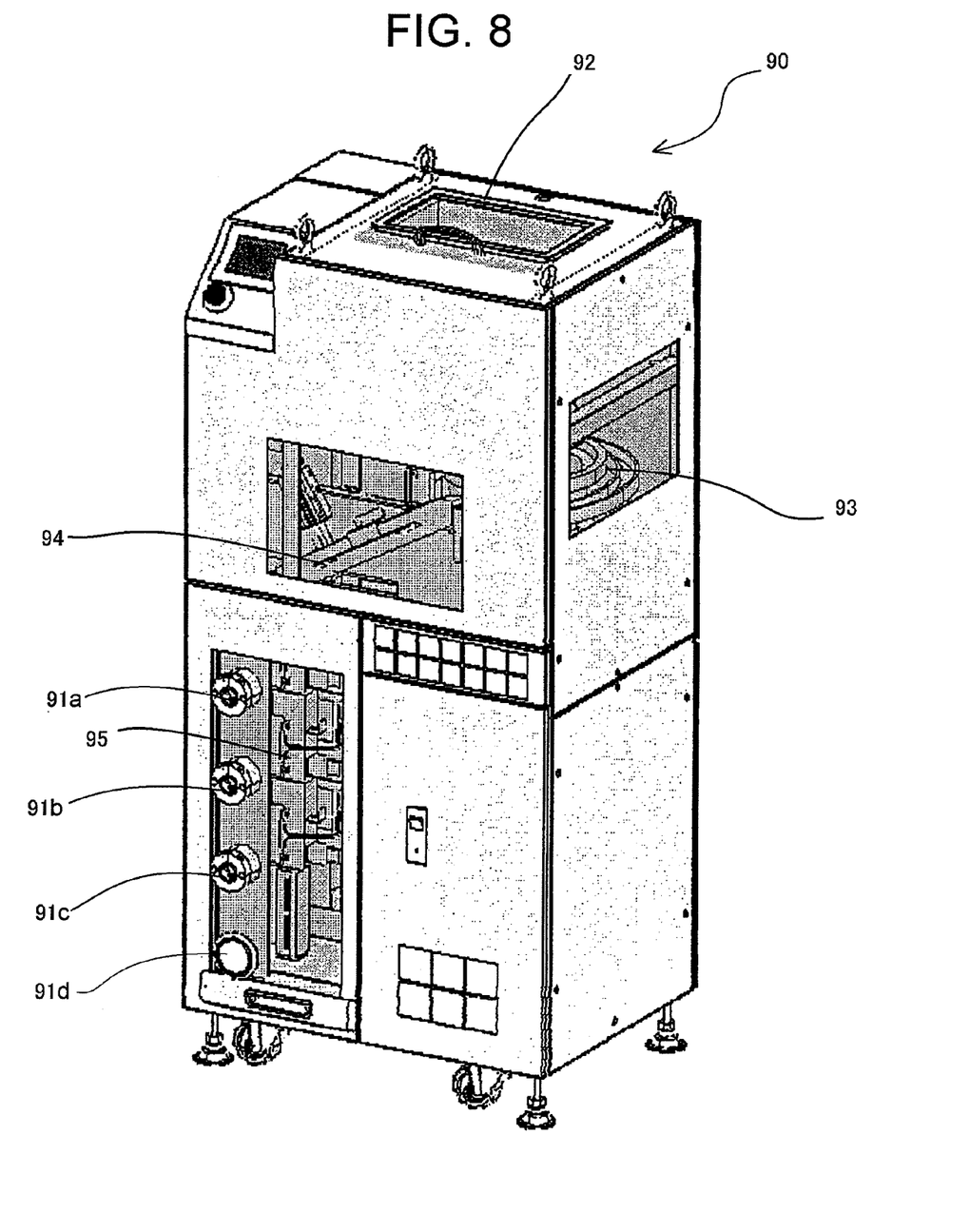
FIG. 8 is a perspective whole appearance of a vertical IC tag introducing machine for introducing the wireless IC tags.

FIG. 8 is a perspective view showing the appearance of the IC tag introducing machine 90 when it is viewed from the front side thereof, which is adapted to use the wireless IC tag 10 or the wireless IC tag 20 being produced by molding the wireless IC tag with a protective enclosure. This example shows a vertical-type IC tag introducing machine, in which a plurality of tag release outlets 91a to 91d are aligned in a vertical direction. This IC tag introducing machine 90 has an IC tag feed hopper 92 at the top, and hoses (not shown) are connected to the plural tag release outlets 91. The wireless IC tags are released in series from each of those tag release outlets 91 to a kneading vessel (not shown) for fresh concrete. The columnar wireless IC tags are fed at a predetermined interval from the tag feed hopper 92 locating at the top into a vibratory alignment device 93 adapted to uniform the aspect of each IC tag and are fallen through the inclined falling chute 94 while keeping the state of the IC tags so that the end surfaces thereof are directed to the falling direction. Then, data writing is implemented by the reader/writer (not shown) at the stopper in the vertical falling passage 95 locating at the lower position. Then, the wireless IC tags are fed in series from the vertical falling passage 95 to the lateral release outlets 91 and are blown out by virtue of compressed air from the release outlets 91 via hoses to over the kneading vessel.

Additionally, the wireless IC tags having had kneaded in the kneading vessel with fresh concrete are carried by a vehicle loading a concrete mixer thereon to a construction site and are fed together with fresh concrete by virtue of compressed air to be casted for building a concrete construction. After being casted, the wireless IC tags are remained inside the concrete construction and are adapted to implement radio communication with the reader/writer locating outside the concrete construction.

With the wireless IC tag according to the present invention, the communication distance and the directionality of the antennas have been improved. Further, when the wireless IC tag having been molded with the protective enclosure is embedded in the casted material for building a construction, such as cement, mortar and a resin material, and the wireless IC tag locates at a position a certain distance inside from the surface of the construction, the wireless IC tag can perform data communication without error even though it is fixed at any positions and/or angles at random in the construction, e.g. even in the case that the wireless IC tag is embedded in the construction in an inclined state.

What is claimed is:
1. A wireless IC tag comprising:
  an RFID tag module;

a plate-shaped rectangular ferrite core to which the RFID tag module is mounted;

a primary antenna wound around a circumferential surface of the plate-shaped rectangular ferrite core, the primary antenna being connected with the RFID tag module;

a pair of secondary antennas, each of the pair of secondary antennas being wound around a circumferential surface of the plate-shaped rectangular ferrite core and being connected with the RFID tag module, wherein the wireless IC tag is formed by molding the plate-shaped rectangular ferrite core in substantially the center of a columnar outer shell body such that a central axis line in a signal transmission/reception direction of the plate-shaped rectangular ferrite core fits together with a central axis line of the columnar outer shell body so that a signal transmission/reception surface of the plate-shaped rectangular ferrite core is opposite to an end surface of the columnar outer shell body, and wherein the primary antenna is wound around a substantially middle position on the circumferential surface of the plate-shaped rectangular ferrite core, and the pair of secondary antennas are wound separately around the circumferential surface of the plate-shaped rectangular ferrite core at both lateral positions of the primary antenna.

2. The wireless IC tag according to claim 1, wherein the primary antenna and the pair of secondary antennas are formed by printing technique.

3. The wireless IC tag according to claim 1, wherein circumferential protrusions are formed on peripheries of both end portions of the columnar outer shell body.

4. The wireless IC tag according to claim 1, wherein a plurality of concave grooves are formed in a surface of the columnar outer shell body.

5. The wireless IC tag according to claim 1, wherein a plurality of concave grooves extending in an axial direction are formed in a body section of the columnar outer shell body.

6. A wireless IC tag comprising:

an RFID tag module;

a plate-shaped rectangular ferrite core to which the RFID tag module is mounted;

a primary antenna wound around a circumferential surface of the plate-shaped ferrite rectangular core, the primary antenna being connected with the RFID tag module;

a pair of secondary antennas, each of the pair of secondary antennas being wound around a circumferential surface of the plate-shaped ferrite rectangular core and being connected with the RFID tag module, wherein the primary antenna includes (i) a first primary antenna wound around the circumferential surface of the plate-shaped rectangular ferrite core in a first direction and (ii) a second primary antenna wound around the circumferential surface of the plate-shaped rectangular ferrite core in a second direction perpendicular to the first direction, wherein the pair of secondary primary antennas includes (i) a first pair of secondary primary antennas wound separately around the circumferential surface of the plate-shaped rectangular ferrite core at both lateral positions of the first primary antenna and (ii) a second pair of secondary primary antennas wound separately around the circumferential surface of the plate-shaped rectangular ferrite core at both lateral positions of the second primary antenna, and wherein the plate-shaped rectangular ferrite core is enclosed by an columnar outer shell body, the plate-shaped rectangular ferrite core including the first primary antenna, the second primary antenna, the first pair of secondary primary antennas, and the second pair of secondary primary antennas.

7. The wireless IC tag according to claim 6, wherein the first primary antenna, the second primary antenna, the first pair of secondary antennas, and the second pair of secondary antennas are formed by printing technique.

8. The wireless IC tag according to claim 6, wherein circumferential protrusions are formed on peripheries of both end portions of the columnar outer shell body.

9. The wireless IC tag according to claim 6, wherein a plurality of concave grooves are formed in a surface of the columnar outer shell body.

10. The wireless IC tag according to claim 6, wherein a plurality of concave grooves extending in an axial direction are formed in a body section of the columnar outer shell body.

11. A wireless IC tag comprising:

a plate-shaped ferrite core having a upside and an underside opposite the upside;

a first RFID tag module mounted on the upside of the plate-shaped ferrite core;

a first spiral antenna formed on the upside of the plate-shaped ferrite core, the first spiral antenna being connected to the first RFID tag module;

a second RFID tag module mounted on the underside of the plate-shaped ferrite core; and a second spiral antenna formed on the underside of the plate-shaped ferrite core, the second spiral antenna being connected to the second RFID tag module.

12. The wireless IC tag according to claim 11, wherein the wireless IC tag is formed by molding the wireless IC tag with a protective enclosure.

* * * * *